United States Patent [19]
Kurisu

[11] Patent Number: 5,543,823
[45] Date of Patent: Aug. 6, 1996

[54] DATA STORING METHOD OF A ROW BUFFER IN ON-SCREEN DISPLAY AND CONTROL CIRCUIT THEREOF

[75] Inventor: Motohiro Kurisu, Seoul, Rep. of Korea

[73] Assignee: SamSung Electronics Co., Ltd., Kyungki-do, Rep. of Korea

[21] Appl. No.: 805,957

[22] Filed: Dec. 12, 1991

[30] Foreign Application Priority Data

Dec. 13, 1990 [KR] Rep. of Korea ............................ 20456

[51] Int. Cl.⁶ .................................................... G09G 5/00
[52] U.S. Cl. ............................ 345/196; 345/202; 345/186
[58] Field of Search .................................... 340/750, 703, 340/748, 798, 799; 382/56; 345/25, 26, 27, 28, 186, 196, 202, 203

[56] References Cited

U.S. PATENT DOCUMENTS

| 4,559,531 | 12/1985 | Buynak | 340/703 |
|---|---|---|---|
| 4,695,835 | 9/1987 | Bugg | 340/750 |
| 4,755,814 | 7/1988 | Olsen | 340/750 X |
| 4,783,650 | 11/1988 | Bugg | 340/750 X |
| 4,868,554 | 9/1989 | Aoki et al. | 340/703 X |

*Primary Examiner*—David E. Harvey
*Attorney, Agent, or Firm*—Robert E. Bushnell, Esq.

[57] ABSTRACT

In an image processing system with an on-screen display function, a method of storing data of a row buffer in the on-screen display is to provide to minimize the capacity of the buffer by storing both character data and color data into a signal row buffer, thereby displaying a great deal of information on a monitor. Also, a row buffer control circuit for simultaneously storing characters and color data in the row buffer comprises a control data storing circuit, a column controlling part, a row controlling part, and a signal processing part.

33 Claims, 4 Drawing Sheets

FIG. 1

| O | | | CHARACTER NUMBER DATA |
|---|---|---|---|
| R | G | B | STARTING COLUMN POSITION DATA |
| | | | CHARACTER DATA 0 |

| O | | | CHARACTER NUMBER DATA |
|---|---|---|---|
| R | G | B | STARTING COLUMN POSITION DATA |
| | | | CHARACTER DATA 0 |
| | | | ″       1 |
| | | | 2 |
| | | | 3 |
| | | | 4 |
| | | | 5 |
| | | | 6 |
| COLOR DATA 1 | | COLOR DATA 0 | |
| ″       3 | | ″       2 | |
| ″       5 | | ″       4 | |
| | | ″       6 | |

*FIG. 2A*

| O | | | CHARACTER NUMBER DATA |
|---|---|---|---|
| R | G | B | STARTING COLUMN POSITION DATA |
| | | | CHARACTER DATA 0 |
| | | | ″       1 |
| | | | 2 |
| | | | 3 |
| | | | 4 |
| | | | 5 |
| | | | 6 |
| | | | 7 |
| | | | 8 |
| | | | 9 |

*FIG. 2B*

| 1 | CHARACTER NUMBER = ØØh |
|---|---|

*FIG. 2C*

| X | R | G | B | X | R | G | B |
|---|---|---|---|---|---|---|---|
| COLOR DATA 1 | | | | COLOR DATA 0 | | | |

DATA STORING METHOD OF A ROW BUFFER IN ON-SCREEN DISPLAY AND CONTROL CIRCUIT THEREOF

BACKGROUND OF THE INVENTION

The present invention relates to image processing systems with an on-screen display function and, more particularly, to a method of storing data of a row buffer into an screen display for minimizing the capacity of a memory by storing both color data and character data into the row buffer and a control circuit thereof.

In methods for displaying characters, there are two types; one uses video RAM (Random Access Memories), and the other uses row buffers.

First, the method using the video RAM comprises the steps of storing both character data and 3-bit color data for displaying the characters into the video RAM, reading the color data stored into the video RAM, and generating the characters with the read color data from a ROM (Read Only Memory).

In other words, the color data stored into the video RAM are read according to input address data, and the characters provided from the ROM have the color data selected in the video RAM, which are applied to a CRT (Cathode Ray Tube) and displayed on a screen.

Second, the method of using the row buffer comprises the steps of storing character data displayed on the screen into a row buffer, and storing the color data of the characters displayed on the screen into another row buffer.

That is, the characters are displayed on the screen by a pair of row buffers.

In both methods, however, if the information of the character data and color data is abundant, the capacity of the video RAM or the row buffer becomes larger. And, a displaying system for processing the character data and the color data is more expanded. Also, if displaying the character data or the color data is not synchronized with a vertical synchronous signal and the processing period of the displaying system exceeds the next display starting time, the fricker phenomenon appears on the screen.

SUMMARY OF THE INVENTION

Therefore, there is an object of the present invention to provide a method of storing data of a row buffer into an on-screen display and a control circuit thereof for minimizing the capacity of the row buffer by storing both character data and color data into a single row buffer, thereby displaying more information on a monitor.

In achieving the above object, the method for storing the character and color data into a single row buffer into the on-screen display comprises a control data storing process for storing row color selection data, character number data, individual color data for displaying the respective characters starting and ending column position data of the displayed characters, a step for discriminating whether the color data is all set to '0' or not by the control data storing process, and a process for storing the character and color data when the color data is all set to '0' at the discriminating step, and a character data storing process for storing only the character data when the color data is not all set to '0'.

There is another object of the present invention to provide a buffer interface control circuit for controlling the retrieval of character and color data stored in a row buffer, the buffer interface control circuit comprising a control data storing circuit for temporarily storing starting column position data and character number data of the displayed characters column; a controlling circuit connected to an output terminal of the control data storing circuit for counting up a column position and for controlling the ON/OFF of the on-screen display according to an input horizontal synchronous signal, a clock signal, and the starting column position data; a row controlling circuit for controlling the row position of the characters displayed on the monitor according to an input vertical synchronous signal; and a signal processing circuit connected to the output terminals of the control data storing circuit, the column controlling circuit, and the row controlling circuit for applying the character and color data provided from the row buffer onto the monitor, thereby simultaneously displaying them on the CRT.

DETAILED DESCRIPTION OF THE INVENTION

Figure 1:
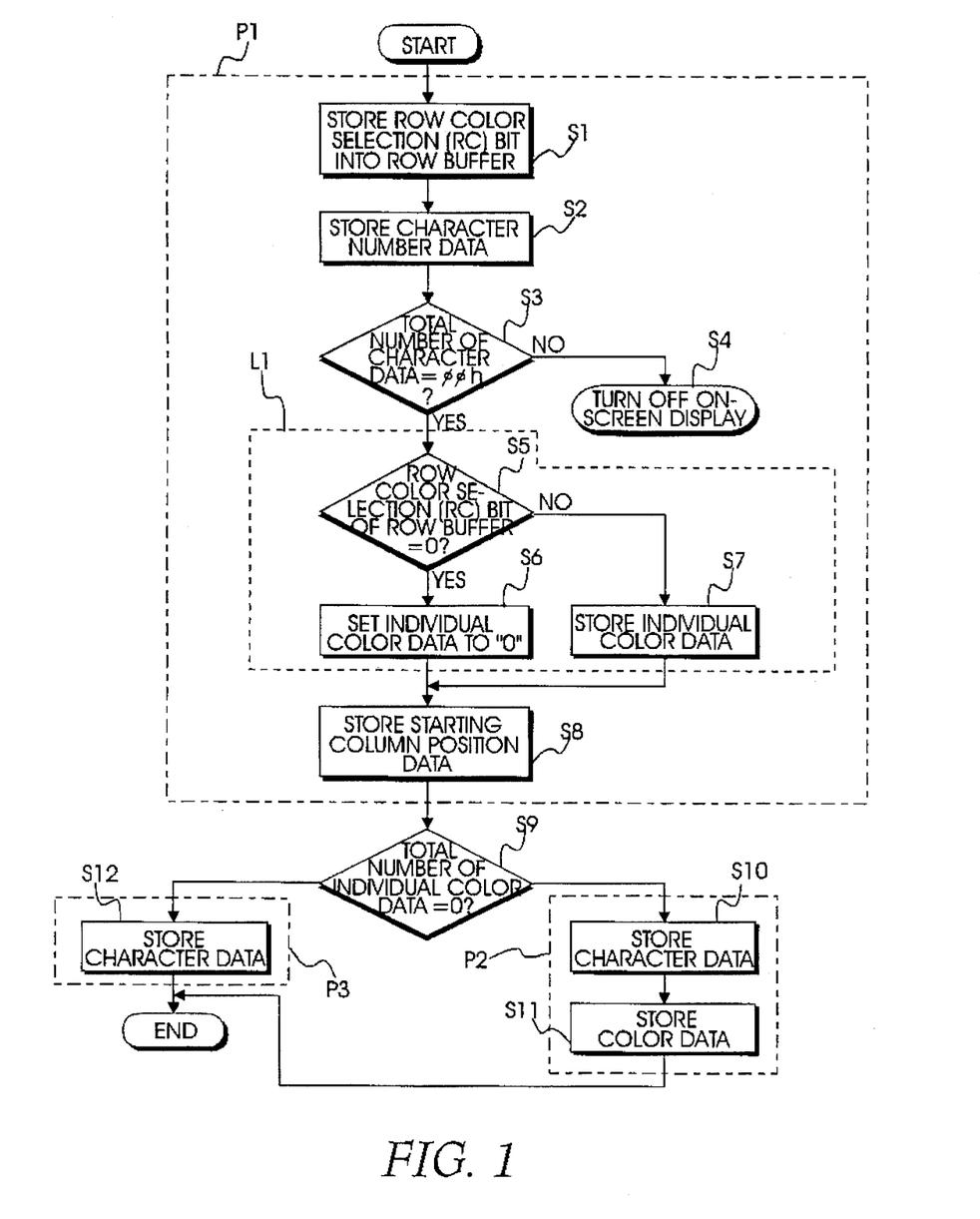
FIG. 1 illustrates a flow chart of a method of storing data of a row buffer in an on-screen display according to the present invention.

FIG. 1 illustrates a flow chart of a method of storing data into a row buffer for an on-screen display according to the present invention.

A control data storing process P1 includes a step S1 for storing a row color selection RC bit into a row buffer, a step S2 for storing character number data CT, a step S3 for discriminating the existence or absence of character data displayed on a screen, a step S4 for turning off the on-screen display if there is no character displayed on the screen, a routine L1 for storing individual color data CS for the character data to be displayed on the screen, and a step S8 for storing starting column position data CSP.

The routine L1 includes a step S5 for discriminating whether the row color selection RC bit is '0' or not at step S3, a step S6 for setting all of the individual color data to '0' if the row color selection RC bit is '0' at step S5, a step S7 for storing the input individual color data if the row color selection RC bit is '1'. If the row color selection RC bit is '0', all the characters are to be displayed with the same color. In contrast, however, if the row color selection (RC) bit is '1', the characters are to be displayed with different colors.

On the other hand, after performing the step S8 in the control data storing process P1, a step S9 for discriminating whether all of the individual color data are set to '0' at step S6 in the routine L1 or not is performed.

If all of the individual color data are set to '0', a character and color data storing process P2 is performed. But, if the individual color data is not all set to '0' at step S9, a character data storing process P3 is performed to display only the character data with a selected color.

The character and color data storing process P2 includes a step S10 for storing the character data at a plurality of addresses and a step S11 for storing the color data to select the color of the character data in each address.

Also, the character data storing process P3 includes only a step S12 for storing the character data with the color selected by the individual color data.

Figure 2A:
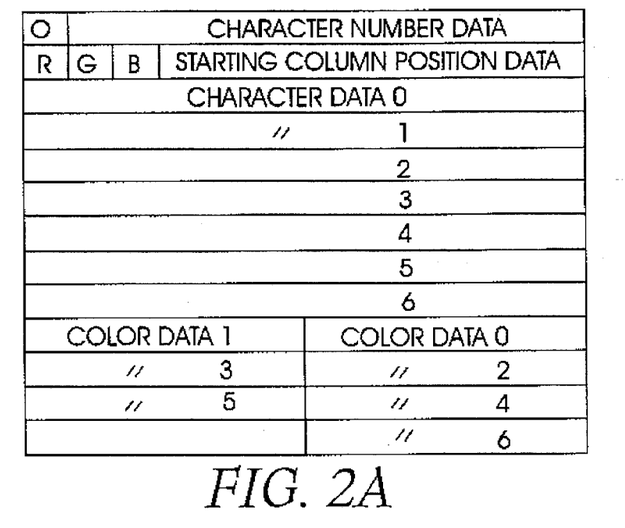
FIGS. 2A–2C illustrate the storage formats of storing data of a row buffer in an on-screen display according to the present invention.
Figure 2B:
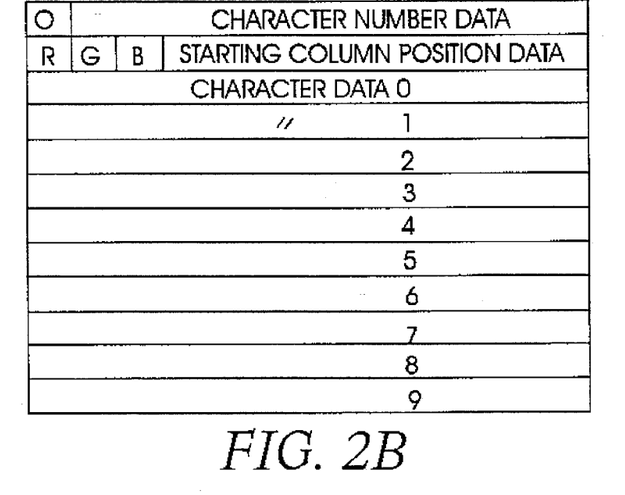
Figure 2C:
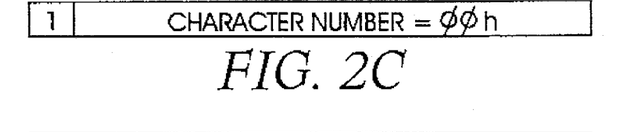

FIGS. 2A–2C illustrate three kinds of data structures which are transferred to the row buffer in the on-screen display according to the present invention.

FIG. 2A is a state diagram of the row buffer after performing the control data storing process P1, the discriminating step S9, and the character and color data storing process P2. FIG. 2B is a state diagram of the row buffer after performing the control data storing process P1, the discriminating step S9, and the character data storing process P3. FIG. 2C is a state diagram of the buffer after performing the step S3 in the control data storing process P1.

The step S4 is performed to turn off the on-screen display when there is not character displayed on the buffer.

Figure 3:
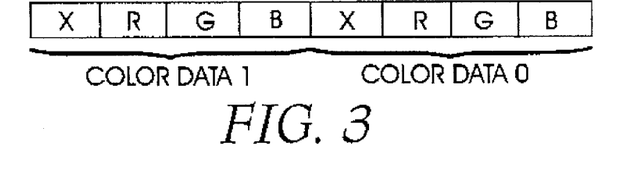
FIG. 3 illustrates the method of storing color data as shown in FIG. 2.

FIG. 3 is the format of the color data stored at the step S11 in the character and color data storing process P2, wherein the color data of an even address is stored into right 3 bits and that of an odd address into left 3 bits.

Figure 4A:
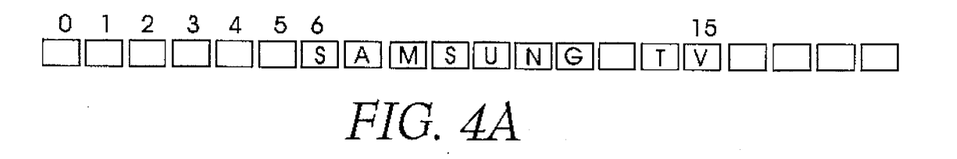
FIGS. 4A and 4B illustrate the screen state and the storage state of one embodiment as shown in FIG. 2A respectively according to the present invention.
Figure 4B:
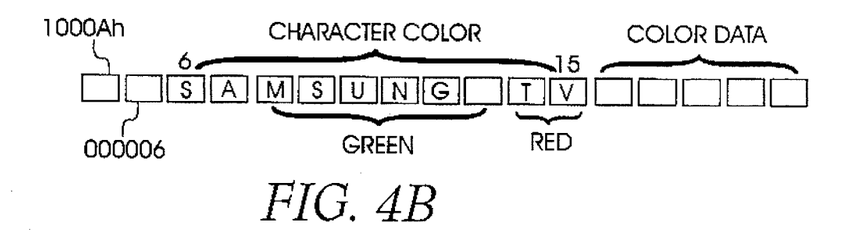
Figure 4C:
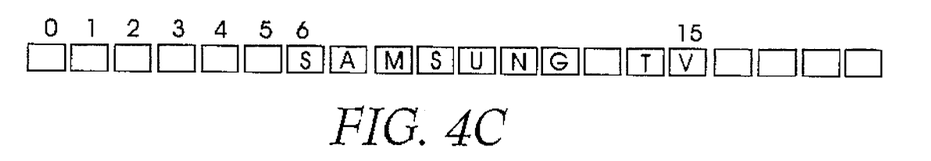
FIGS. 4C and 4D illustrate the screen state and the storage state of another embodiment as shown in FIG. 2B.
Figure 4D:
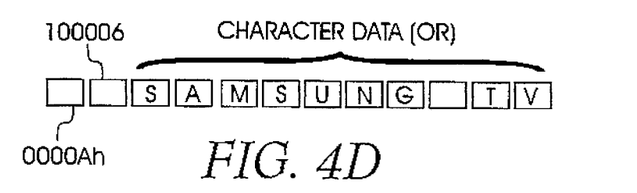

FIGS. 4A and 4B illustrate the screen and storage states of the embodiment of FIG. 2A, respectively. FIGS. 4C and 4D are the screen state and storage states of the embodiment of FIG. 2B, in which characters "SAMSUNG TV" are displayed from the sixth column.

Figure 5:
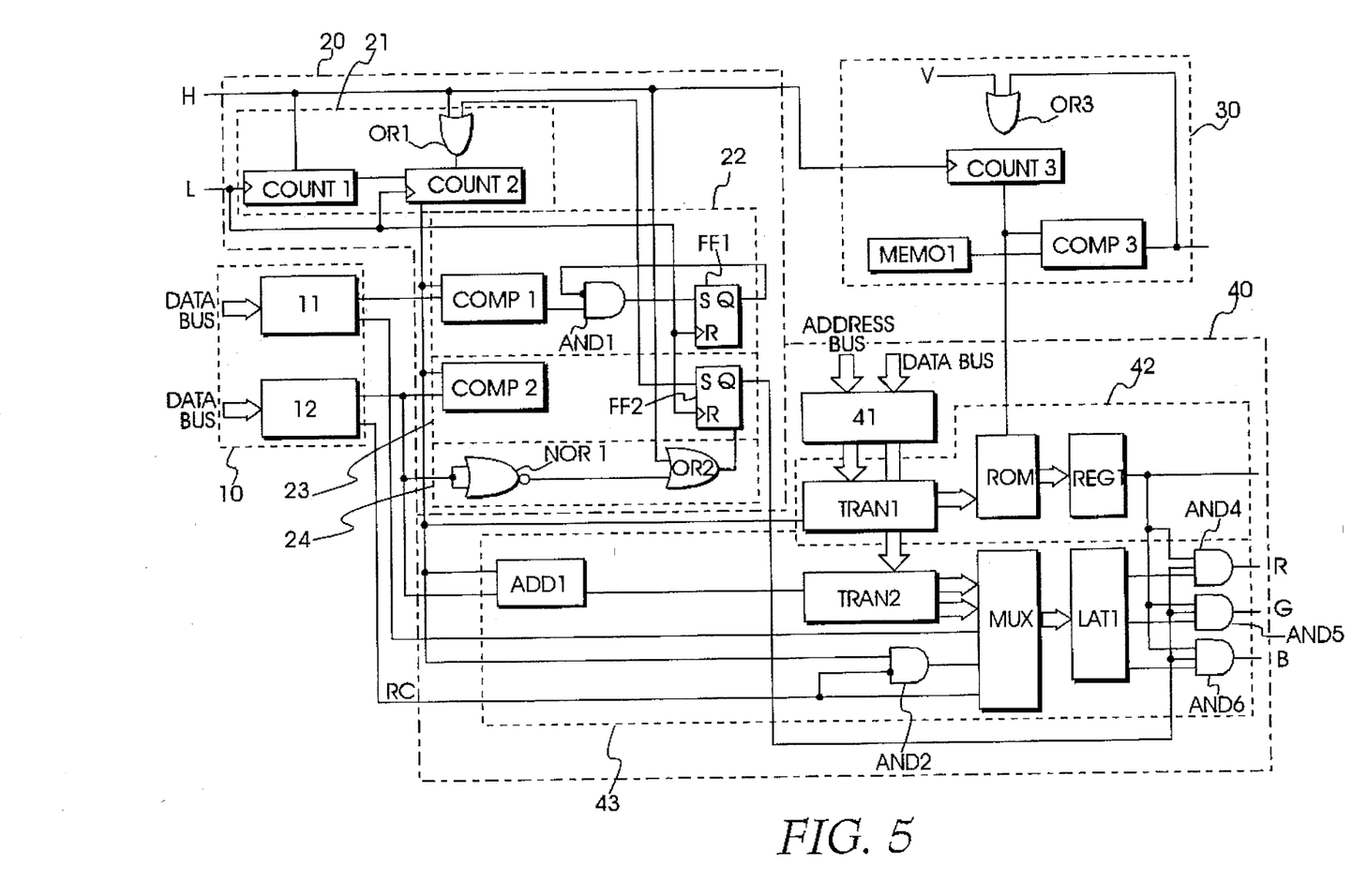
FIG. 5 illustrate a row buffer interface for enabling on-screen display of character data and color data stored in a row buffer structure.

FIG. 5 is a circuit diagram of the row buffer controller in the on-screen display according to the present invention, in which an interface circuit between the row buffer and the CRT is illustrate in detail.

The row buffer controller comprises a control data storing circuit 10 for temporarily storing the starting column position data and the character number data provided from the row buffer, a column controller means 20 for counting the column position according to the starting column position data, the horizontal synchronous signal H, and the oscillating signal L and for controlling the on-screen display, a row controlling circuit 30 for controlling the row position of the displayed character on the screen according to the vertical synchronous signal V, and a signal processing circuit 40 connected to an output terminal of the row controlling circuit 30 for simultaneously providing the character data and the color data from the row buffer.

In more detail, the control data storing circuit 10 includes a first control register 11 for storing the starting and ending column position data provided from the row buffer and a second control register 12 for storing the character number data and the row color selection RC bit of the row buffer.

On the other hand, the column controlling circuit 20 includes a column counting circuit 21 for counting column numbers according to the horizontal synchronous signal H and the oscillating signal L and a starting column controlling circuit 22 for resetting the horizontal synchronous signal H when the starting column position corresponds with the starting column position data provided from the first control register 11 in the control data storing circuit 10, an ending column controlling circuit 23, and a system controlling circuit 24.

The column counting circuit 21 includes a dot counter COUNT1 for counting dots on the screen by the horizontal synchronous signal H and the oscillating signal L and a column counter COUNT2 connected to the dot counter COUNT1 for generating a ripple carrier signal to increase the number one by one.

The starting column controlling circuit 22 includes a comparator COMP1 for comparing the column number counted by the horizontal synchronous signal H with the starting column position data provided from the first control register 11 in the control data storing circuit 10, an AND gate AND1 for resetting the column counter COUNT2 according to the output signal of the comparator COMP1, and a flip-flop FF1 for delaying the output signal of the AND gate AND1 during a predetermined period.

The output signal of the flip-flip FF1 in the starting column controlling circuit 22 is fedback to another input terminal of the AND gate AND1 in order to reset the column counter COUNT2 in dependence upon the output signal of the comparator COMP1.

The ending column controlling circuit 23 includes a comparator COMP2 connected to the column counter COUNT2 of the column controlling circuit 21 in the column controller 20 and the second control register 12 in the control data storing circuit 10 for comparing the counted column numbers with the total number of the characters stored at the second control register 12, and a flip-flop FF2 connected to the comparator COMP2 for delaying the output signal of the comparator COMP2 during the predetermined period when the ending column position data of the displayed characters corresponds with the predetermined ending column position data.

Under this condition, the system controlling circuit 24 comprises a NOR gate NOR1 for turning off the on-screen display when the total number of the displayed characters is 00h and another OR gate OR2 for combining the output signal of the NOR gate NOR1 with the horizontal synchronous signal H. The output terminal of the OR gate OR2 is connected to the clock terminal of the flip-flop FF2 of the ending column controlling circuit 23. That is, if there is no character stored into the row buffer, the output signal of the NOR gate NOR1 becomes a low-level signal, applying no clock signal to the flip-flop FF2. Thus, the flip-flop FF2 is not driven, thereby turning off the on-screen display.

On the other hand, the row controlling circuit 30 includes a row address counter COUNT3 for counting the address of the row buffer according to the vertical synchronous signal V, a temporary memory part MEMO1 for temporarily storing a predetermined row position, a comparator COMP3 for comparing the output signal of the temporary memory MEMO1, in which the predetermined value of row size is stored with the output signal of the row address counter COUNT3, and a OR gate OR3 for combining the output signal of the comparator COMP3 with the vertical synchronous signal V.

Also, the signal processing circuit 40 includes a buffer 41 of the signal controlling circuit to for normalizing the character and color data provided through address and data buses from the row buffer, a character data processing circuit 42, and a color data processing circuit 43.

The character data processing circuit 42 comprises a transmitter TRAN1 for transmitting the normalized character data according to the output signal of the column counter COUNT2 in the column controlling circuit 21, a ROM (Read Only Memory) for generating the character signals corresponding to the address of the row address counter COUNT3 in the row controlling circuit 30, and a shift register REG1 for shifting and storing the generated characters one by one into the output terminal of the ROM.

The color data processing circuit 43 comprises an adder ADD1 for adding the output signal of the column controller 20 with the output signal of the second control register 12 in the control data storing circuit 10, a transmitter TRAN2 for transmitting the color data through the character data transmitter TRAN1 to the adder ADD1, a multiplexer MUX for serially transmitting 8-bit color data as shown in FIG. 3, wherein the multiplexer MUX inputs the starting column position data provided from the first register 11 in the control data storing circuit 10, an AND gate AND2 for logically combining the output signal of the column counter COUNT2 in the column controlling circuit 20 with the row buffer color selection RC bit stored into the second control register 12 in the control data storing circuit 10, a latch LAT1, and AND gates AND4–AND5 for providing three color signals R(red), G(green), and B(blue) by combining the character signal from the character data processing circuit 42, the display control signal from the system controlling circuit 24, and the color signal from the latch LAT1.

Now, the method of storing the data into the row buffer is described in detail, referring to FIG. 1 to FIG. 3.

In the step S1 of the control data storing routine P1 as shown in FIG. 1, the row color selection RC bit is stored as '0' into the row buffer when the characters are to be displayed with various colors. In contrast, the row color selection RC bit is stored as '1' when the characters are to be displayed with a single color.

Next, character number data CT which exposes the total number of the characters displayed on the screen is stored into the step S2 of the control data storing process P1 and checked whether '00'H or not in the step S3 of the control data storing process P2. If the data CT is '00'H, i.e., there is no data displayed, the on-screen display is turned off in the step S4 of the control data storing process P1.

However, if there are characters displayed on the screen in the step S3, it is checked in the step 35 of the color selection data storing routine L1 whether the characters are displayed with various colors. In other words, after checking the row color selection RC bit, if the row color selection RC bit is '0', the 3-bit individual color data is set to '0' in the step S6 of the individual color data storing routing L1, whereas if the color selection RC bit is '1', the individual color data is set to the input individual color data CS in the step S7 of the individual color data storing routine L1. In this case, if the individual color data is '100', all characters are displayed with a red color; if '010', all characters are displayed with a green color; and, if '001', all characters are displayed with a blue color.

Then, the starting column position data CSP is stored in the step S8, and next, the individual color data CS is checked whether '000' is reset or not in the step S9.

That is, if the individual color data CS is set to '000', both character data CH and color data CO are stored in the steps S10 and S11 of the character and color data storing process P2. In contrast, if the individual color data is not set to '000', only the character data CH is stored in the step S12 of the character data storing process P3.

As described above, in case of displaying the characters with various colors in the storing of the row buffer, as shown in FIG. 2A, the row color selection RC bit is stored as '0' into the first one bit at the first address, and the character number data CT is stored into the second bit at the first address. Also, the individual color data CS is stored as '00H' into the first three bits at the second address, and the starting column position data CSP is stored into the second bit at the second address. At a plurality of addresses, the character data CH and the color data CO are stored.

But, in case of displaying the characters with a single color, in the state of the row buffer as shown in FIG. 2B, the row color selection RC bit is stored as '1' into the first one obit at the first address, and the character number data CT is stored into the second bit at the first address. The color selection data CS is stored into the first three bits at the second address, and the starting column position data CSP is stored into the second bit at the second address. At a plurality of addresses, only the character data is stored.

On the other hand, in case of turning off the on-screen display, in the storing state of the row buffer as shown in FIG. 2C, the storage format data RC is stored as '0' into the first bit at the first address, and the character number data is stored as '00'H into the second bit, representing that there is no characters displayed.

For example, in case of displaying the characters "SAMSUNG TV" with various colors on the screen as shown in FIG. 4A, the row color selection RC bit and the character number data CT are stored as '0000AH' in the first address and the individual color data CS, and the starting column position data CSP is stored as '000006' in the second address. Also, the characters "SAMSUNG TV" with character data (CH) are stored in the range of the third address to the fifteenth address, the color data CO in the sixteenth address is stored as shown in FIG. 3. That is, the character "SAMSUNG" is stored as '010', and the character 'TV' as '100'.

In addition to, in case of displaying the character "SAMSUNG TV" with only one color on the screen as shown in FIG. 4C, the storing state of the row buffer is shown in FIG. 4D. The row color selection RC bit and the character number data CT are stored as 1000Ah' in the first address, and the individual color data CS and the starting column position data CSP are stored as '100006' in the second address. That is, the characters "SAMSUNG TV" are displayed with green color. Also, the characters "SAMSUNG TV" with the character data CH are stored in the range of the third address to the sixteenth address.

In the embodiment described above, it is only a limit to set up the column position of the character displayed, but it is possible to set up the row position of the character displayed because the row starting position data is stored at a bit which stores the starting column position data CSP.

The data stored into the row buffer is temporarily stored into the first and second control registers 11 and 12 in the control data storing circuit 10 as shown in FIG. 5.

That is, the starting column position data CSP and the ending column position data are stored into the first control register 11, and the individual color data CS and the character number data CT are temporarily stored into the second control register 12.

On the other hand, the dot counter COUNT1 in the column counting circuit 21 of the column control circuit 20 counts up the pulses input into the horizontal synchronous signal H, and the ripple carrier signal increased by the dot counter COUNT1 is applied to the column counter COUNT2 in the column counting circuit 21 of the column control means 20.

The output signal of the column counter COUNT2 is applied to the comparator COMP1 in the starting column controlling circuit 22 and compared with the starting column position data stored into the first control register 11 in the control data storing circuit 10.

The output signal of the comparator COMP1 is applied to the AND gate AND1 in the starting column control circuit 22, and the output of the AND gate AND1 to the flip-flop FF1.

In other words, if the column counter 21 starts to count up the count position, the output of the comparator COMP1 becomes a high-level signal, and by this high-level signal the counter 21 is reset once. Also, the output of the flip-flip FF1 is set to the high-level signal. The output signal of the flip-flip FF1 is inverted and applied to the AND gate AND1 during the horizontal synchronous signal H.

On the other hand, the column position counted by the column counter COUNT2 in the column counting circuit 21 is compared with the predetermined ending column position data by the comparator COMP2 in the ending column controlling circuit 23. When the counted column data corresponds with the predetermined data, the comparator COMP2 provides an output signal to the flip-flop FF2 in the ending column and is reset to the flip-flop FF1.

If the character number data CT stored into the second register is '00'H, 12 the character number data CT is applied to the NOR gate NOR1 in the system control circuit 24, and the output of the NOR gate NOR1 becomes '0'. The output of this NOR gate NOR1 is applied to the OR gate OR2, thereby turning off the flip-flop FF2 in the ending column control circuit 23. That is, if there is no character data CH in the control data storing circuit 10, all the systems for the on-screen display is turned off.

On the other hand, the input vertical synchronous signal V is applied to the row address counter COUNT3 through the OR gate OR3 of the row control circuit 30, to determine the first row position of the displayed characters. The output of the row address counter COUNT3 is compared with the output data of the temporary memory MEMO1 by the comparator COMP3. Thus, when the counted row data by the row address counter COUNT3 corresponds with the predetermined row data, the output of the comparator COMP3 becomes '1'. The output signal of this comparator COMP3 is fedback to the OR gate OR3, resetting the row address counter COUNT3. The vertical synchronous signal V is used as a reset signal for determining the predetermined row position and the horizontal synchronous signal L as the reset signal for determining the predetermined column position.

On the other hand, the character data CH and the color data CO provided from the row buffer are normalized by the buffer 41 in the signal processing circuit 40, and the output character data from the buffer 41 is transmitted to the ROM by the transmitter TRAN1 in the data processing circuit 42 according to the output data from the column counting circuit 21 in the column control circuit 20 and from the row address counter COUNT3 in the row control circuit 30. The character signals generated by the ROM are applied to the CRT (not shown in FIG. 5) through the shift register REG1 in the character data processing circuit 42.

On the other hand, the color data of the buffer 41 is applied to the address ADD1 in the signal processing circuit 40. Then, a control signal is provided to simultaneously provide the character signals from the character data processing circuit 42.

According to the control signal of the adder ADD1, the output color data of the buffer 41 is transmitted to the multiplexer MUX through the transmitter TRAN2 in the color data processing circuit 43. Simultaneously, the starting column position data CSP stored in the first control register 11 of the control data storing circuit 10 is applied to the multiplexer MUX.

However, in case of displaying all the characters with only on color on the screen, the converted row color selection RC bit and the output signal from the column counter COUNT2 are applied to the AND gate AND2.

The signals applied to the multiplexer MUX are transmitted through a single channel to the latch LAT1 in the color data processing circuit 43. The latched signals are applied to the AND gates AND4–AND6. The output signals of the AND gates AND4–AND6 are also controlled by the output signals of the flip-flop FF2 in the ending column controlling circuit 23 and these of the latching part LATI That is, by the output signal at the ending column controlling circuit 23 the ON/OFF of the on-screen display is controlled.

Assuming that the characters "SAMSUNG TV" are displayed with various colors as shown in FIGS. 2A and 2B, the starting and ending column position data are stored as '006' and '00F' into the first control register 11, and the individual color data and the character number data are also stored as '000' and 0Ah' into the second control register 12 as shown in FIG. 5.

On the other hand, the column counting circuit 21 counts up the column number according to the input horizontal synchronous signal H and provides the counted number. If the counted number from the column counter COUNT2 corresponds with the predetermined starting column data stored in the first control register 11, the comparator COMP1 in the starting column controlling circuit 22 is provided from the high-level signal. The high-level signal from the comparator COMP1 is applied to the flip-flop FF1 to be set. At this time, the value of the column counter COUNT2 is '006'.

If the value of the row address counter COUNT3 in the row control circuit 30 corresponds with the predetermined starting row position data for displaying the characters and the value of the column counter COUNT2 is '006', the normalized character data is provided from the buffer 41 in the signal processor 40. Also, by the adder ADD1 in the signal processor 40, the output data form the column counter COUNT2 and the character number data are added. Then, the color data corresponding to the address provided from the adder ADD1 is output.

That is, the character data and the color data are simultaneously provided, and thus, the character 'SAMSUNG' is displayed with the green color, while the character 'TV' is displayed with the red color. At this time, if the data value of the column counter COUNT2 is '00F', the color data is controlled by the output of flip-flop FF2 in the ending column controlling circuit 23.

On the other hand, if the character number data CT is '00'H, the flip-flop FF2 in the ending column controlling circuit 23 is turned off by the NOR gates NOR1 and the OR gate OR2 in the system controlling circuit 24.

As described above, according to the present invention both the character data and the color data are simultaneously stored into a single row buffer, thereby reducing the capacity of the row buffer during the data expansion. Thus, the data expansion is easy at a low cost, and the data processing time is shortened. Also, the flicker phenomenon due to disagreement between the data processing time of the total system and the data transmitting time of the row buffer is eliminated, thereby providing the clean screen.

What is claimed is:

1. A method of storing character and color data into a row buffer to be displayed on an on-screen display, comprising:
a control data storing process for storing a row color selection bit, character number data, individual color data, and starting and ending column position data;

a step of discriminating whether every bit of said individual color data is set to a first logic state by said control data storing process;

a character and color data storing process for storing said character date and color data when every bit of said individual color data is set to said first logic state; and a character data storing process for storing only said character data when every bit of said color data is not set to said first logic state.

2. The method according to claim 1, wherein said control data storing process comprises the steps of:

storing said row color selection bit in said row buffer;

storing said character number data representative of a total number of characters to be displayed on said on-screen display;

detecting whether said character data is displayed on said on-screen display;

turning off said on-screen display when said character data is not detected;

performing a routine for storing said individual color data when said character data is detected; and storing said starting and ending column position data.

3. The method according to claim 2, wherein said routine for storing said individual color data comprises the steps of:

determining whether said row color selection bit is representative of one of said first logic state and a second logic state;

setting all of said individual color data to logic states of a series of said first logic state when said row color selection bit has said first logic state; and storing said individual color data when said row color selection bit has said second logic state;

whereby all the characters represented by said character data are displayed with either a plurality of colors when said row color selection bit has said second logic state, or a single color when said row color selection bit has said first logic state.

4. A row buffer interface control circuit for controlling retrieval of character data and color data stored in a row buffer, said row buffer interface control circuit comprising:

control data storing means for temporarily storing input starting and ending column position data, character number data, and row color selection data from said row buffer;

column controlling means connectable to said control data storing means, for counting column positions of characters, and for controlling operations of an on-screen display according to a first synchronous signal, an oscillating signal, and said starting column position data;

row controlling means for controlling row positions of said characters according to a second synchronous signal; and signal processing means connectable to said control data storing means, said column controlling means, and said row controlling means, for simultaneously applying character and color data provided from said row buffer, for enabling a visual display of said characters representative of said character and color data on said on-screen display.

5. The row buffer interface control circuit according to claim 4, wherein said column controlling means comprises:

column counting means for counting said first synchronous signal to provide column counted signals;

starting column control means for resetting said column counting means when said column counted signals correspond with said starting column position data;

ending column control means for comparing said column counted signals with a number of said characters, and determining whether an ending column position of said column counted signals corresponds with said ending column position data; and system control means for controlling said on-screen display.

6. The row buffer interface control circuit according to claim 4, wherein said row controlling means comprises:

row address counter means for counting row addresses according to said second synchronous signal;

memory means for temporarily storing selected row positions;

comparator means for comparing the output signal of said memory means with the output signal of said row address counter means; and gate means for logically combining the output signal of said comparator means with said second synchronous signal.

7. The row buffer interface control circuit according to claim 4, wherein said signal processing means comprises:

buffer means for normalizing said character and color data provided via an address bus and a data bus;

character data processing means for processing said character data via said buffer means; and color data processing means for processing said color data via said buffer means.

8. The row buffer interface control circuit according to claim 5, wherein said starting column controlling means comprises:

comparator means for comparing said column counted signals with said starting column position data;

gate means for resetting said column counting means according to the output signal of said comparator means; and flip-flop means for delaying the output signal of said gate means for a delayed period.

9. The row buffer interface control circuit according to claim 5, wherein said ending column controlling means comprises:

comparator means connectable to said column counting means and said control data storing means, for comparing said ending column position with said ending column position data; and flip-flop means coupled to receive the output signal of said comparator means, for controlling said on-screen display.

10. The row buffer interface control circuit according to claim 5, wherein said system controlling means comprises:

first gate means for detecting a total number of said characters is zero; and second gate means for turning off said on-screen display by combining the output signal of said first gate means with said first synchronous signal.

11. The row buffer interface control circuit according to claim 7, wherein said character data processing means comprises:

transmitter means for transmitting said normalized character data according to the output signal of said column controlling means to provide transmitted character data;

memory means coupled to receive said transmitted character data, for generating said characters representative of said character and color data when said transmitted character data correspond to said row addresses of said row controlling means; and shift register means for shifting the generated characters on a one-by-one basis.

12. The row buffer interface control circuit according to claim 7, wherein said color data processing means comprises:

adder means for adding the output signal to said column controlling means with the output signal of said control data storing means;

transmitter means for transmitting said color data;

multiplexer means for serially transmitting 3-bit color data;

means for logically combining the output signal of said column counting means with storage format data stored in said control data storing means;

latch means for latching the multiplexed 3-bit color data; and a plurality of AND gates for providing color signals representative of red color, green color and blue color by combining said character signals from said character data processing means, said display control signal from said system controlling means, and said 3-bit color data from said latch means.

13. A row buffer interface controlling circuit for an on-screen display, comprising:

means for providing starting and ending column position signals, character number signals and color selection signals from a row buffer;

column controlling means for counting a number of column addresses in dependence upon a horizontal synchronous signal to provide column position counted signals, and for comparing said column position counted signals with said starting and ending column position signals to control a display of characters on an on-screen display in dependence upon said character number signals;

row controlling means for counting a number of row addresses in dependence upon a vertical synchronous signal to provide row position counted signals, and comparing said row position counted signals with selected row position signals to control said display of characters on said on-screen display; and signal processing means responsive to said column controlling means and said row controlling means, for processing character signals and color signals from said row buffer to display said characters representative of said character signals and color signals on said on-screen display in dependence upon said starting column position signals and color selection signals.

14. The row buffer interface controlling circuit according to claim 13, wherein said column controlling means comprises:

counter means coupled to receive said horizontal synchronous signal and an oscillating signal, for counting column addresses in accordance with said horizontal synchronous signal to provide said column position counted signals;

starting column control means for resetting said horizontal synchronous signal in dependence upon a comparison of a starting column position of said column position counted signals and said starting column position signals;

ending column control means for providing a displayed control signal to control the display of said characters representative of said character signals and said color signals on said on-screen display in dependence upon a comparison of a number of said column position counted signals with said character number signals, and determination of whether an ending column position of said column position counted signals corresponds with said ending column position signals; and system control means for enabling generation of said displayed control signal in dependence upon said column position counted signals and said horizontal synchronous signal.

15. The row buffer interface controlling circuit according to claim 14, wherein said starting column control means comprises:

comparator means for comparing said column position counted signals with said column position signals to provide a column compared signal;

gate means for providing a reset signal for resetting said horizontal synchronous signal in dependence upon said column compared signal; and flip-flop means having a reset terminal coupled to receive said oscillating signal, a data input terminal coupled to receive said reset signal, and a data output terminal coupled to an input terminal of said gate means, for delaying said reset signal for a delayed period.

16. The row buffer interface controlling circuit according to claim 14, wherein said ending column control means comprises:

comparator means for comparing the number of said column position counted signals with said character number signals to provide a character number compared signal;

flip-flop means having a reset terminal coupled to receive said oscillating signal, for delaying said character number compared signal for a delayed period when said ending column position of said column position counted signals corresponds with said ending column position signals.

17. The row buffer interface controlling circuit according to claim 14, wherein said system control means comprises:

first gate means coupled to receive said character number signals, for providing a logic gate signal representative by one of logic states of "ON" and "OFF" in dependence upon determination of whether a total number of said characters is zero; and second gate means coupled to receive said logic gate signal and said horizontal synchronous signal, for enabling generation of said displayed control signal to control the display of said characters representative of said character signals and color signals on said on-screen display.

18. The row buffer interface controlling circuit according to claim 13, wherein said row controlling means comprises:

means for storing said selected row position signals representative of selected numbers of rows;

counter means for counting row addresses from said row buffer in accordance with said vertical synchronous signal to provide said row position counted signals; and comparator means for comparing said row position counted signals with said selected position signals to provide a feedback signal to said counter means for providing said row position counted signals.

19. The row buffer interface controlling circuit according to claim 14, wherein said signal process means comprises:

buffer means for normalizing said character signals and color signals from said row buffer to provide normalized character signals and normalized color signals;

first transmitter means for transmitting said normalized character signals in accordance with said column position counted signals to provide transmitted character signals;

memory means for storing said transmitted character signals, and for providing said character signals in dependence upon reception of said row addresses;

register means for shifting said character signals on a one-by-one basis to provide shifted character signals;

adder means for adding said column position counted signals and said character number signals to provide an added signal;

second transmitter means for transmitting said normalized color signals in dependence upon said added signal to provide transmitted color signals;

gate means for logically combining said column position counted signals and said color selection signals to provide a logic gate signal;

multiplexer means for enabling serial transmission of said color signals representative by 8 bits in dependence upon said transmitted color signals, said starting column position signals, said logic gate signal and said color selection signals;

latch means for latching said color signals representative by said 8-bits to provide color latching signals; and means coupled to receive said color latching signals and said shifted character signals, for providing a plurality of character signals in one of a single selected color and a plurality of selected colors in dependence upon said display control signal.

20. The row buffer interface controlling circuit according to claim 19, further comprised of said plurality of character signals providing in one of said single selected color and said plurality of selected colors by:

determining whether a logic state of said color selection signals is one of a first logic state and a second logic state; and setting said color signals to logic states of a series of said first logic state when said logic state of said color selection signals is said first logic state to enable a visual display of said characters representative of said plurality of character signals on said on-screen display with:

said plurality of selected colors when said logic state of said color selection signals is said second logic state, and said single selected color when said logic state of said color selection signals is said first logic state.

21. A method for controlling retrieval of character and color data stored in a row buffer for an on-screen display, comprising the steps:

receiving starting and ending column position signals, character number signals and color selection signals from the row buffer;

generating column position counted signals by counting a number of column addresses in dependence upon a horizontal synchronous signal and comparing said column position counted signals with said starting and ending column position signals to control a display of characters on an on-screen display in dependence upon said character number signals;

generating row position counted signals by counting a number of row addresses in dependence upon a vertical synchronous signal and comparing said row position counted signals with selected row position signals to control said display of characters on said on-screen display; and processing character signals and color signals from said row buffer to enable a display of said characters representative of said character signals and color signals on said on-screen display in dependence upon said starting column position signals and color selection signals.

22. The method according to claim 21, wherein said column position counted signals generating step comprises the steps of:

counting column addresses in accordance with said horizontal synchronous signal to provide said column position counted signals;

resetting said horizontal synchronous signal in dependence upon a comparison of a starting column position of said column position counted signals and said starting column position signals;

generating a displayed control signal to control the display of said characters representative of said character signals and said color signals on said on-screen display in dependence upon a comparison of a number of said column position counted signals with said character number signals, and determination of whether an ending column position of said column position counted signals corresponds with said ending column position signals; and enabling generation of said displayed control signal in dependence upon said column position counted signals and said horizontal synchronous signal.

23. The method according to claim 21, wherein said row position counted signals generating step comprises the steps:

storing said selected row position signals representative of selected numbers of rows;

counting row addresses from said row buffer in accordance with said vertical synchronous signal to generate said row position counted signals; and comparing said row position counted signals with said selected position signals to provide a feedback signal for enabling generation of said row position counted signals.

24. The method according to claim 21, wherein said character signals and color signals processing step comprises the steps of:

normalizing said character signals and color signals from said row buffer to generate normalized character signals and normalized color signals;

transmitting said normalized character signals in accordance with said column position counted signals to provide transmitted character signals;

storing said transmitted character signals, and for providing said character signals in dependence upon reception of said row addresses;

shifting said character signals on a one-by-one basis to provide shifted character signals;

adding said column position counted signals and said character number signals to provide an added signal;

transmitting said normalized color signals in dependence upon said added signal to provide transmitted color signals;

logically combining said column position counted signals and said color selection signals to provide a logic gate signal;

enabling serial transmission of said color signals represented by a plurality of bits in dependence upon said transmitted color signals, said starting column position signals, said logic gate signal and said color selection signals;

latching said color signals represented by said plurality of to provide color latching signals; and generating a plurality of character signals in one of a single selected color and a plurality of selected colors in dependence upon said display control signal.

25. The method according to claim 24, wherein said plurality of character signals are provided in one of said single selected color and said plurality of selected colors by:

determining whether a logic state of said color selection signals is one of a first logic state and a second logic state;

setting said color signals to logic states of a series of said first logic state when said logic state of said color selection signals is said first logic state to enable a visual display of said characters representative of said plurality of character signals on said on-screen display with either said plurality of selected colors when said logic state of said color selection signals is said second logic state, or said single selected color when said logic state of said color selection signals is said first logic state.

26. A method for storing character and color data in a row buffer for an on-screen display, comprising the steps:

storing a row color selection bit into said row buffer;

storing character number data into said row buffer, said character number data representing the total number of characters to be displayed on said on-screen display;

turning off said on-screen display when the total number of characters does not reach a predetermined value;

storing individual color data for character data to be displayed, as characters, on said on-screen display, into said row buffer, when the total number of characters reaches said predetermined value;

storing starting and ending column position data into said row buffer to control said character data to be displayed on said on-screen display;

making a determination whether all of the individual color data are set to a first logic state;

storing only said character data into said row buffer, when all of the individual color data are not set to said first logic state to enable a visual display of said characters with a selected color from said individual color data on said on-screen display; and alternatively storing said character data and color data in a plurality of addresses of said row buffer, when all of the individual color data are set to said first logic state to enable a visual display of said characters with a plurality of colors from said individual color data on said on-screen display.

27. The method according to claim 26, wherein said individual color data storing step comprises the steps of:

determining whether a logic state of said color selection bit is one of said first logic state and second logic state;

setting said individual color data to logic states of a series of said first logic state, when said logic state of said color selection signals is said first logic state; and alternatively storing said individual color data in said row buffer, when said logic state of said color selection signals is said second logic state to enable selection of colors for all the characters to be displayed on said on-screen display.

28. A method for storing character and color data in a single row buffer comprising a plurality of addresses for an on-screen display, comprising the steps:

storing a row color selection bit and character number data in a first address of said row buffer, said character number data representing the total number of characters to be displayed on a visual display;

storing color selection data and starting column position data in a second address of said row buffer, said color selection data selecting colors for characters to be displayed on said visual display, and said starting column position data controlling positions of said characters displayed on said visual display;

storing character data and color data on remaining addresses of said row buffer in dependence upon a determination that said characters are to be displayed on said visual display with different colors designated by said color selection data, said character data representing said characters to be displayed on said visual display, and said color data representing different colors for said characters; and alternatively storing only said character data on remaining addresses of said row buffer in dependence upon a determination that said characters are to be displayed on said visual display with a single color designated by said color selection data.

29. The method as claimed in claim 28, wherein said determination is based upon whether a logic state of said row color selection bit is "1" or "0".

30. The method according to claim 1, further comprises of storing said individual color data by:

determining whether said row color selection bit is representative of one of said first logic state and a second logic state;

setting all of said individual color data to logic states of a series of said first logic state when said row color selection bit has said first logic state; and storing said individual color data when said row color selection bit has said second logic state;

displaying all the characters representative by said character data with one of a plurality of colors when said row color selection bit has said second logic state, and a single color when said row color selection bit has said first logic state.

31. The row buffer interface controlling circuit according to claim 14, further comprises of said row controlling means comprising:

means for storing said selected row position signals representative of selected numbers of rows;

counter means for counting row addresses from said row buffer in accordance with said vertical synchronous signal to provide said row position counted signals; and comparator means for comparing said row position counted signals with said selected position signals to provide a feedback signal to said counter means for providing said row position counted signals.

32. The row buffer interface controlling circuit according to claim 31, comprised of said signal processing means comprising:

buffer means for normalizing said character signals and color signals from said row buffer to provide normalized character signals and normalized color signals;

first transmitter means for transmitting said normalized character signals in accordance with said column position counted signals to provide transmitted character signals;

memory means for storing said transmitted character signals, and for providing said character signals in dependence upon reception of said row addresses;

register means for shifting said character signals on a one-by-one basis to provide shifted character signals;

adder means for adding said column position counted signals and said character number signals to provide an added signal;

second transmitter means for transmitting said normalized color signals in dependence upon said added signal to provide transmitted color signals;

gate means for logically combining said column position counted signals and said color selection signals to provide a logic gate signal;

multiplexer means for enabling serial transmission of said color signals representative by 8 bits in dependence upon said transmitted color signals, said starting column position signals, said logic gate signal and said color selection signals;

latch means for latching said color signals representative by said 8-bits to provide color latching signals; and means coupled to receive said color latching signals and said shifted character signals, for providing a plurality of character signals in one of a single selected color and a plurality of selected colors in dependence upon said display control signal.

33. The row buffer interface controlling circuit according to claim 32, further comprised of said plurality of character signals providing in one of said single selected color and said plurality of selected colors by:

determining whether a logic state of said color selection signals is one of said first logic state and and said second logic state; and setting said color signals to logic states of a series of said first logic state when said logic state of said color selection signals is said first logic state to enable a visual display of said characters representative of said plurality of character signals on said on-screen display with:

said plurality of selected colors when said logic state of said color selection signals is said second logic state, and said single selected color when said logic state of said color selection signals is said first logic state.

* * * * *